US006301039B1

(12) United States Patent
Tench

(10) Patent No.: US 6,301,039 B1
(45) Date of Patent: Oct. 9, 2001

(54) REVERSIBLE ELECTROCHEMICAL MIRROR (REM) STATE MONITORING

(75) Inventor: D. Morgan Tench, Camarillo, CA (US)

(73) Assignee: Rockwell Technologies, LLC, Thousand Oaks, CA (US)

( * ) Notice: Subject to any disclaimer, the term of this patent is extended or adjusted under 35 U.S.C. 154(b) by 0 days.

(21) Appl. No.: 09/660,865

(22) Filed: Sep. 13, 2000

(51) Int. Cl.$^7$ .................................................. G02F 1/153
(52) U.S. Cl. ...................... 359/267; 359/266; 359/268; 359/270; 359/272; 359/273; 359/274
(58) Field of Search ...................... 359/265–275

(56) References Cited

U.S. PATENT DOCUMENTS 6,111,685 * 7/1999 Tench et al. ........................ 359/267

* cited by examiner

Primary Examiner—Georgia Epps
Assistant Examiner—Tuyen Tra
(74) Attorney, Agent, or Firm—James P. O'Shaughnessey

(57) ABSTRACT

Reversible electrochemical mirror (REM) devices typically comprise a conductive oxide mirror electrode that is substantially transparent to radiation of some wavelengths, a counter electrode that may also be substantially transparent, and an electrolyte that contains ions of an electrodepositable metal. A voltage applied between the two electrodes causes electrodeposition of a mirror deposit on the mirror electrode and dissolution of the mirror deposit on the counter electrode, and these processes are reversed when the polarity of the applied voltage is changed. Such REM devices provide precise control over the reflection and transmission of radiation and can be used for a variety of applications, including smart windows and automatically adjusting automotive mirrors. According to the present invention, measurements of the sheet resistance of the mirror electrode in a REM device are correlated with the thickness of electrodeposited mirror metal and can be used to monitor the reflectance of the device. Sheet resistance measurements can be performed while the mirror state of the device is being switched if adequate isolation between the measurement and switching circuits is provided. This can be accomplished by use of external resistors or more sophisticated circuitry, or by taking advantage of the relatively high sheet resistance of the mirror electrode itself. Monitoring the reflectance of REM devices according to this invention provides significant cost and performance advantages.

19 Claims, 6 Drawing Sheets

REVERSIBLE ELECTROCHEMICAL MIRROR (REM) STATE MONITORING

BACKGROUND OF THE INVENTION

1. Field of the Invention

This invention is concerned with devices, such as mirrors and windows, having controllable reflectivity.

2. Description of the Related Art

Sunlight transmitted through windows in buildings and transportation vehicles can generate heat (via the greenhouse effect) that creates an uncomfortable environment and increases air conditioning requirements and costs. Current approaches to providing "smart windows" with adjustable transmission for use in various sunlight conditions involve the use of light absorbing materials. These approaches are only partially effective, since the window itself is heated and because these devices, such as electrochromic devices, are relatively expensive and exhibit limited durability and cycle life. Certain liquid crystal-based window systems switch between transmissive and opaque/scattering states, but these systems require substantial voltages to maintain the transparent state. There is an important need for an inexpensive, durable low voltage smart window with variable reflectivity. Reflecting the light, rather than absorbing it, is the most efficient means for avoiding inside heating. Devices for effectively controlling transmission of light are also needed for a variety of other applications, e.g., energy efficient dimmers for displays.

Bright light from headlamps on following vehicles reflected in automobile rear and side view mirrors is annoying to drivers and creates a safety hazard by impairing driver vision. Currently available automatically dimming mirrors rely on electrochromic reactions to produce electrolyte species that absorb light that would otherwise be reflected from a static mirror. Such devices do not provide close control over the amount of reflected light, and are expensive to fabricate since a very constant inter-electrode spacing is required to provide uniform dimming. Image sharpness is also reduced for electrochromic mirror devices since the reflected light must pass through the electrolyte (twice). There is an important need for an inexpensive adjustable mirror device that provides close control of reflected light with minimal image distortion.

In early attempts to exploit reversible electrodeposition of a metal for light modulation, the deposits obtained on transparent substrates presented a rough and black, gray, or sometimes colored appearance (typical of finely-divided metals) and exhibited poor reflectivity and high light absorbance, especially when thick. Such deposits have been investigated for display applications involving reflectance from the background, with white pigments often being added to improve contrast. Warszawski (U.S. Pat. No. 5,056,899), which is concerned with displays, teaches that reversible metal electrodeposition is most appropriate for display applications, since significant disadvantages for transmission devices were given (e.g., the possibility of metal deposition at the counter electrode). In general, the prior art literature teaches that an auxiliary counter electrode reaction is required for transmission-type devices to avoid metal electrodeposition at the counter electrode as metal electrodissolution occurs at the working electrode, which would produce no net change in transmission. Such teachings imply that the application of reversible metal deposition to smart windows must involve light absorption by the finely divided electrodeposited metal, which would result in heating of the device itself and thus the space inside. The low reflectance of this type of deposit would not be appropriate for adjustable mirror applications.

Electrolytes described in the early prior art literature contain auxiliary redox species (e.g., bromide, iodide, or chloride) that are oxidized (e.g., to bromine, iodine, or chlorine) at the counter electrode during metal deposition under the high drive voltages used. This introduces chemistry-related instabilities during long term operation and leads to deposit self erasure on open circuit via chemical dissolution of the metal deposit, e.g., $2Ag^0+Br_2 \rightarrow 2AgBr$. In most cases, this auxiliary redox process hinders metal deposition at the counter electrode during erasure, introducing a threshold voltage that is desirable for display applications. This auxiliary redox process may represent a significant side reaction even when metal electrodeposition/ dissolution occurs at the counter electrode and a threshold voltage is not observed. See, e.g., Warszawski, columns 3–4 (when copper or nickel were present in the counter electrode paste) and Duchene et al., Electrolytic Display, IEEE Transactions on Electron Devices, Volume ED-26, Number 8, Pages 1243–1245 (August 1979); French Patent No. 2,504, 290 (Oct. 22, 1982). High switching voltages of at least 1 V were used for all the electrodeposition devices which have been found in the patent and literature prior art.

A paper by Ziegler et al. (Electrochem. Soc. Proc. Vol. 93–26, p. 353, 1993) describes an investigation for display applications of the reversible electrodeposition of bismuth in aqueous solutions containing a large molar concentration ratio of halide anions to the trivalent bismuth ion. Halide anion oxidation served as the counter electrode reaction with the 1.5 V write voltage used.

The deposits obtained were dark in color and were shown to decrease the reflectance of the ITO surface. Subsequent reports by these authors (Electrochem. Soc. Proc. Vol. 94–31 (1994), p. 23; Solar Energy Mater. Solar Cells 39 (1995), p. 317) indicated that addition of copper ions to the electrolyte was necessary to attain complete deposit erasure. These authors also utilized a counter electrode reaction other than metal electrodeposition/dissolution, and also never obtained a mirror deposit. Thus, Ziegler et al. provide no teachings relevant to the effect of electrolyte composition on the deposition/dissolution rate and quality of mirror electrodeposits.

Warszawski teaches that the use of a grid counter electrode would give a less uniform deposit since deposition on the transparent working electrode is highly localized in the vicinity of the counter electrode grid lines (a consequence of the very thin film of gel electrolyte used). Warszawski also teaches the use of an aqueous gel electrolyte to minimize sensitivity to atmospheric contaminants and to avoid the necessity of having a leak tight seal. Such electrolytes, however, have much more limited temperature and voltage operating ranges compared with organic-based electrolytes with high boiling solvents.

One effort to improve the deposit quality of the electrolytic solution used in a reversible electrodeposition process, described in U.S. Pat. No. 5,764,401 to Udaka et al., requires the addition of organic additives to the solution. Unfortunately, such additives are typically destroyed during the electrodeposition process, greatly limiting cycle life. Furthermore, this approach fails to produce highly-reflective mirror-like deposits that are required for adjustable mirror applications and provide the superior heat rejection needed for smart windows.

U.S. Pat. No. 5,880,872 to Udaka teaches that the "working" electrode of a reversible electrodeposition structure is degraded, and its working life thereby shortened, by the high voltage required to dissolve the metal film deposited upon it. Udaka states that this consequence can be avoided by adding an alkali metal halide to the device's electrolytic solution, preferably in an amount which provides an alkali metal halide to silver halide ratio of between 0.5 to 5. However, the described electrolytic formulation fails to provide the inherent stability, high quality deposits, good erasure and long cycle life needed for practical applications. Mirror deposits were never obtained.

Prior art literature teaches that the memory effect is temporary. This is a consequence of the occurrence of a counter electrode reaction other than metal electrodeposition/dissolution. The energetic oxidation products generated at the counter electrode can cause dissolution of the metal deposit on the working electrode either chemically on open circuit (slow) or electrochemically during short circuit (fast).

Nishikitani et al. (European Patent No. 0,618,477) teaches that the counter electrode in electrochromic devices for smart window applications can be a metal grid which is substantially transparent. Since no metal electrodeposition occurs in electrochromic devices, however, the grid in this case is used to provide a transparent electrode, not to maintain transparency by localizing metal deposition. In addition, to provide adequate electrical capacity for electrochromic devices, Nishikitani's grid would need a very high surface area (at least 10 $m^2/g$ and preferably 50 to 5,000 $m^2/g$) and a line width of 50 to 5,000 $\mu m$; alternatively, a plurality of dots on a conducting substrate can be used, but the dots must contain fine particles having electrical capacitance of not less than 1 farad/g.

A reversible electrochemical mirror (REM) device permitting efficient and precise control over the reflection/transmission of visible light and other electromagnetic radiation is described in U.S. Pat. Nos. 5,903,382 and 5,923,456 to Tench et al., which are assigned to the same assignee as the present application. In this device, an electrolyte containing ions of an electrodepositable metal is sandwiched between a mirror electrode and a counter electrode, at least one of which is substantially transparent to the radiation. A typical transparent mirror electrode is indium tin oxide (ITO) or fluorine doped tin oxide (FTO) deposited on a transparent glass (or plastic) pane which serves as the substrate. Application of a voltage causes the electrodepositable metal, e.g., silver, to be deposited as a mirror on the mirror electrode while an equal amount of the same metal is dissolved from the counter electrode. When the voltage polarity is switched, the overall process is reversed so that the mirror metal is at least partially dissolved from the mirror electrode. A thin layer of noble metal, e.g., 15–30 Å platinum, on the transparent conductor is usually required to improve nucleation so that a mirror deposit is obtained. The thickness of mirror metal layer present on the mirror electrode determines the reflectance of the device for radiation, which can be varied over a wide range.

The REM technology can be used to provide control of either light reflectance, transmission, or both. A transmissive REM device suitable for smart window applications utilizes a noble metal counter electrode that is locally distributed, e.g., in a grid, on a transparent substrate, e.g., glass, so that mirror metal deposited thereon does not appreciably increase light blockage. In this case, high light transmission is provided by a locally distributed counter electrode of relatively small cross-sectional area and the device reflectance/transmission is adjusted via the thickness of mirror metal on the mirror electrode. As described in U.S. Pat. No. 5,903,382 to Tench et al., such a transmissive counter electrode is not required for reflective REM devices used for adjustable mirror applications. An electrolytic solution providing the inherent stability, high deposit quality, complete deposit erasure, long cycle life and fast switching needed for most practical applications is described in U.S. patent application Ser. No. 09/356,730, filed Jul. 19, 1999, now U.S. Pat. No. 6,111,685 which is assigned to the same assignee as the present invention.

A significant problem with adjustable mirrors of the type suitable for automotive applications, including both REM and electrochromic mirrors, is that simple means for monitoring the reflectance of such devices are not available. Consequently, it is necessary to place a light sensor in front of the mirror to provide feedback so that the reflectance can be adjusted to the desired level. Such sensors are not only expensive but are also aesthetically undesirable, increase the bulkiness of the device, and typically monitor only a small area while blocking a portion of the mirror itself. Similar difficulties exist for variable transmission devices as well. An inherent means for monitoring the mirror state of adjustable reflectance/transmission devices could provide significant advantages in terms of costs, performance, space utilization and market acceptance.

SUMMARY OF THE INVENTION

This invention involves use of a relatively simple electrical measurement to determine the state of the mirror electrode in a reversible electrochemical mirror (REM) device, which is comprised of an electrolyte containing electrodepositable metal ions, e.g., silver ions, in contact with a mirror electrode and a counter electrode. The electrolyte may be a solid electrolyte, a liquid electrolytic solution, or an electrolytic solution rendered viscous, semi-solid or solid via a stiffening agent. The mirror electrode is typically comprised of a thin layer of noble metal (e.g., platinum) on a layer of a transparent conducting oxide (e.g., indium tin oxide) on a glass or plastic substrate. Generally, the counter electrode is a sheet or layer of the electrodepositable mirror metal for devices that are designed to control radiation reflection, and is a locally distributed electrode for devices that also transmit radiation. The device reflectance is determined by the thickness of the mirror metal layer on the mirror electrode, which can be adjusted by applying a voltage of the appropriate polarity to cause mirror metal electrodeposition or dissolution, while the reverse process occurs at the counter electrode.

According to the method of the present invention, the thickness of mirror metal deposited on the mirror electrode of a reversible electrochemical mirror (REM) is determined from its effect on the sheet resistance of the mirror electrode, which provides an indirect measure of the reflectance of the device. A thin layer of deposited mirror metal has a large effect on the sheet resistance since the resistivity of the transparent oxide conductor typically used for the mirror electrode is relatively high (at least 10 ohm/square). Note that the parallel current path through the electrolyte has a negligible effect for the relatively resistive electrolytes and small cell gaps typically employed. The resistance is measured between two separate contacts placed on the REM mirror electrode, which may be the same ones used to apply voltage for switching the mirror state of the device. One preferred configuration for a rectangular mirror electrode is to place the electrical contacts only along two opposite sides so that the measured resistance reflects the average thickness of deposited mirror metal. This configuration also yields the most uniform mirror formation and erasure, and consequently the most uniform mirror reflectance. Direct contact between the electrical contacts and the electrolyte should be avoided since plating on the contacts could affect the uniformity of the mirror deposits obtained. For the preferred configuration of rectangular mirrors given above, the mirror uniformity and measurement precision can be further improved by minimizing the extent to which the sides of the mirror electrode not provided with electrical contacts extend beyond the mirror border, e.g., into a seal.

Resistance between the two electrical contacts may be determined from the current response to a direct (dc) or alternating (ac) voltage applied across the two separate contacts on the mirror electrode. An ac voltage is usually advantageous to minimize voltage losses due to contact resistances between the contacts and the mirror electrode, which may vary appreciably with time and would introduce errors in the measurement. The voltage perturbation frequency is preferably chosen to minimize contact resistances as well as the effects of capacitive and inductive losses, which introduce a phase shift between the applied ac voltage and the ac current response. In some cases, it may be necessary to take this phase shift into account to calculate an accurate sheet resistance for the mirror electrode.

By utilizing appropriate circuitry and contact configurations, the sheet resistance of the mirror electrode can be determined while mirror metal is being deposited or erased so as to permit the thickness of deposited mirror metal, and indirectly the device reflectance, to be monitored during mirror state switching. One simple approach is to use the same contacts for switching the mirror state and measuring its sheet resistance and to place equivalent resistors between each of the two mirror electrode contacts and the switching voltage source. Such parallel resistors reduce the overall resistance between the contacts but can be chosen to be sufficiently large that good sensitivity to the thickness of mirror metal is retained. In this case, an ac rather than a dc resistance measurement is preferred to minimize mutual interference between the mirror state switching and measurement processes. For this approach, additional switching voltage is required to offset the voltage drops across the isolation resistors, which are in series with the switching power source. More sophisticated circuitry could be used to avoid significant resistance in the switching circuit and to more effectively isolate it from the measurement circuit. A preferred approach is to provide separate contacts for mirror state switching and the sheet resistance measurement and utilize the mirror electrode sheet resistance itself to provide adequate circuit isolation.

Further features and advantages of the invention will be apparent to those skilled in the art from the following detailed description, taken together with the accompanying drawings.

DETAILED DESCRIPTION OF THE INVENTION

Figure 1:
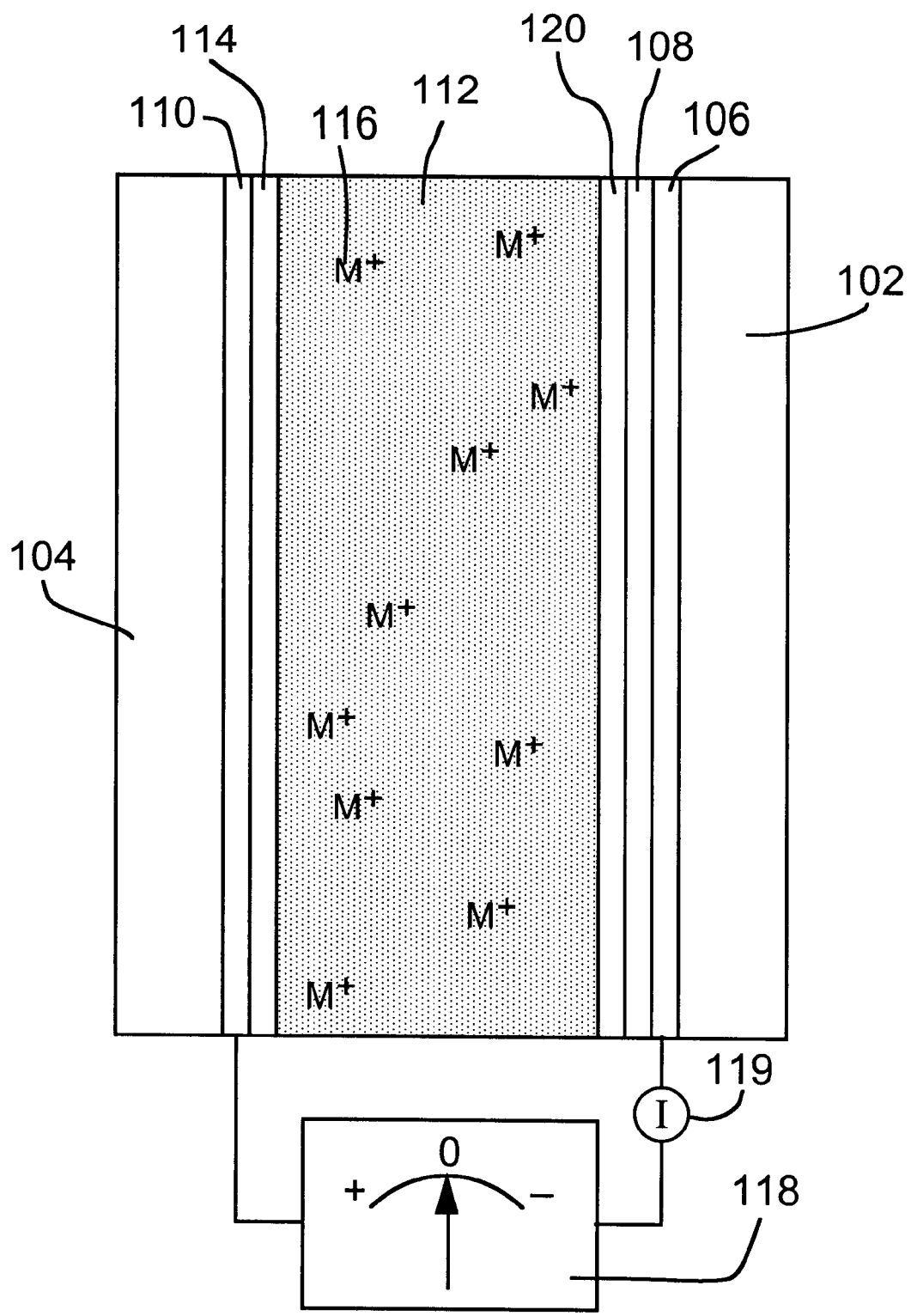
FIG. 1 is a cross sectional view depicting a representative design of a reversible electrochemical mirror (REM) device.

FIG. 1 is a cross sectional view depicting a representative design of a reversible electrochemical mirror (REM) to which the present invention pertains. Some dimensions, particularly layer thicknesses, are disproportionate in the drawings in order to more effectively illustrate the structure and function of the device. The REM device in this example, which provides precise control over the reflection of electromagnetic radiation, includes a first substrate 102, which is substantially transparent to the portion of the spectrum of electromagnetic radiation which is to be controlled, and a second substrate 104. An electrically conducting film 106, which is also substantially transparent, is deposited on the first substrate. The film 106, with the optional addition of an electrochemically stable surface modification layer 108, functions as the mirror electrode. The conducting oxide film 106 is typically indium tin oxide (ITO) or fluorine doped tin oxide (FTO). The surface modification layer 108 is typically a noble metal selected from the group consisting of platinum, iridium, gold, osmium, palladium, rhenium, rhodium and ruthenium. An underlayer of another metal (e.g., aluminum, chromium, hafnium, molybdenum, nickel, titanium, tungsten or zirconium) may be used to improve the adhesion of surface modification layer 108.

A second electrode 110 is deposited on the second substrate 104 and functions as the counter electrode. The counter electrode 110 can alternatively be a bulk electrode, a metal plate or sheet for example, with sufficient rigidity that the second substrate 104 would not be needed. For a device that also transmits radiation, electrode 110 may be a locally distributed electrode (not shown in FIG. 1), as described in U.S. Pat. No. 5,923,456 to Tench et al., which is assigned to the same assignee as the present application. The counter electrode 110 is electrochemically stable or is covered with a sufficient thickness of an active metal layer 114 to avoid exposure of the counter electrode surface to the electrolyte. It may also be protected from exposure to the electrolyte by a coating of electrochemically stable metal. Relatively stable metals that might be used as the counter electrode material or as a protective layer or coating on the counter electrode include Pt, Ir, Au, Os, Pd, Re, Rh, Ru, Cr, Ni, Ti and stainless steel. The surface of electrode 110 may be roughened to reduce reflection of radiation from the electrode or to improve switching speed by lowering the current density (via increased surface area).

An electrolyte 112 is located between and in electrical contact with the electrodes 106 and 110, and contains electrodepositable mirror metal cations 116. The REM cell may be initially charged with mirror metal prior to assembly by depositing the metallic layer 114 on the electrode 110, by depositing the layer 120 on the nucleation layer 108 or directly on electrode 106, or, as depicted in FIG. 1, by depositing partial mirror metal layers on each of the two electrodes. Metal ions 116, which contain the same metal atoms as the layers 114 and 120, are dissolved within the electrolyte 112 such that the metal atoms can be reversibly electrodeposited on and electrodissolved from the mirror and counter electrodes. The surface modification layer 108 applied to the mirror electrode 106 facilitates the nucleation on this electrode of electrodeposited metal from the ions 116 to form a mirror deposit that highly reflects electromagnetic radiation.

The electrolyte 112 contains cations of an electrodepositable metal and may contain a solvent and complexing anions. Preferred REM electrolytic solutions utilizing non-aqueous solvents are described U.S. Pat. Nos. 5,903,382 and 5,923,456 and U.S. Patent Applications with Ser. No. 09/356,730 (filed Jul. 19, 1999) now U.S. Pat. No. 6,111,685 and Ser. No. 09/333,385 (filed Jun. 15, 1999) U.s. Pat. No. 6,166,847 to Tench et al., which are all assigned to the same assignee as the present application. The solvent is preferably selected from the group consisting of gamma-butyrolactone (GBL), ethylene glycol (EG), dimethylsulfoxide (DMSO), dimethylformamide (DMF), and mixtures of these solvents. The electrodepositable metal is preferably selected from the group consisting of silver, bismuth, copper, tin, cadmium, mercury, indium, lead, antimony, thallium and zinc, and may be an alloy. The complexing anions are preferably selected from the groups consisting of halides (e.g., chloride, bromide and iodide) and pseudohalides (cyanide and thiocyanate), and are typically present in molar excess compared to the electrodepositable metal cations. Excess halide/pseudohalide anions are added as compounds having a cation that is not electroactive in the voltage range over which the REM device is operated. Preferred non-electroactive cations include $Li^+$, $Na^+$, $H^+$ and organoammonium (e.g., alkylammonium or arylammonium) ions, but cations of magnesium, calcium, potassium, rubidium, cesium, strontium or barium might also be used.

In some embodiments of the invention, the electrolyte 112 may be an electrolytic solution that includes one or more stiffening agents to significantly increase the electrolyte viscosity and/or impede electrolyte flow, forming a viscous liquid, semi-solid or solid electrolyte. Dispersed inorganic materials, e.g., silica or alumina, have minimal effect on the electrolyte conductivity, are typically electrochemically inert in the voltage ranges of interest for REM devices, and form thixotropic gels that can be liquefied by mechanical shearing for facile injection in REM cells. Such gels are also relatively stable with temperature and adhere well to REM electrode materials. Other possible REM electrolyte stiffeners include organic gelling agents, e.g., polyacrylonitrile (PAN), polyvinylalcohol (PVA), polyvinylacetate (PVOAc), and polymethylmethacrylate (PMMA), which dissolve in liquid electrolytes to form plastic-like gels at ambient temperatures. The specific organic polymer gelling agent is chosen based on gel stability and chemical and electrochemical compatibility with a given electrolyte and the metal mirror formation/erasure processes. Porous solid polymers that absorb large quantities of electrolyte, e.g., ormasils and porous polypropylene, might also be used. In some cases, the solid polymer matrix may be formed by in situ polymerization of monomers dissolved in the electrolyte. Some solid polymers that might be used as REM electrolytes have anionic backbones and are cation conducting so that a solvent or added anions might not be required.

Electrolyte 112 might also contain one or more coloring agents to impart a desirable color to the electrolyte, or absorb light strongly over the wavelength region of interest to avoid reflection from the counter electrode in reflectance-type devices. For example, a black color can be imparted to electrolytic solutions via addition of a small amount of dispersed carbon black, which is typically used in conjunction with an electrolyte stiffener to prevent settling under the influence of gravity. Different colors can be imparted by addition of one or more inorganic or organic materials, especially dye compounds, which must be selected to be compatible with other electrolyte components and to be electrochemically unreactive in the REM voltage operating range.

The REM device is intended for use in conjunction with a source of electrical potential 118, which has a reversible polarity and adjustable or pre-set positive and negative potential values, connected between the mirror and counter electrodes 106 and 110. When a negative electrical potential is applied to the mirror electrode 106 relative to the counter electrode 110, metal 114 deposited on the counter electrode 110 is dissolved from the counter electrode into the electrolyte 112, while metal ions 116 in the electrolyte are electrodeposited from the electrolyte onto the surface modification layer 108 of the mirror electrode 106. When the polarity of the applied potential is reversed, such that a positive potential is applied to the mirror electrode 106 relative to the counter electrode 110, deposited metal is dissolved from the mirror electrode into the electrolyte 112 and dissolved metal is electrodeposited from the electrolyte onto the counter electrode 110.

The thickness of deposited metal layer 120 present on the mirror electrode determines the reflectivity which the mirror exhibits for radiation. The process is reversible, and the mirror may be maintained at virtually any point between substantially complete deposition on and substantially complete erasure from the mirror electrode 106 without additional current being required. Thus the REM mirror may be adjusted to any reflective value from approximately 0% reflective to approximately 100% reflective. The lower limit of reflectivity for the REM device is affected by the reflectivities of the nucleation layer 108, the electrode 106, and the substrate 102; these reflectivities may be reduced by use of anti-reflection coatings of the type commonly employed, or by adjusting the layer thicknesses. Likewise, the maximum reflectivity of the REM device is affected by light absorption in the substrate 102, the electrode 106, and the nucleation layer 108.

All of the various layers that affect the overall reflectivity of the REM device for radiation, particularly the layer 120 of deposited mirror metal, must typically be very uniform in thickness to provide the highly uniform reflectance over the mirror surface required for most applications. Consequently, a given mirror metal thickness corresponds to a definite amount of mirror metal with respect to the charge required for its electrodeposition or dissolution. Note that these processes generally occur with nearly 100% charge efficiency for REM electrolytes.

In principle, the reflectance of a REM device could be known at any given time via the thickness of the mirror metal deposit by incorporating a charge integration device 119 (FIG. 1) and keeping track of the all of the charge passed for metal electrodeposition and dissolution as the mirror cycled. Device 119 could be a coulometer for direct measurement and integration of charge or an ammeter coupled with a current integration device. However, as the mirror was subjected to multiple cycles in which complete erasure of the mirror metal did not occur, measurement imprecision and minor efficiency imbalances between the metal electrodeposition and dissolution reactions would introduce cumulative errors in the calculated thickness and associated reflectance. These errors could be mitigated by periodic full erasure of mirror metal layer 120 from mirror electrode 106 to establish a new starting point for the charge integration, but this would be impractical at high cycle rates and the necessity of such periodic erasure would be unacceptable for many applications. In addition, the equipment required for accurate coulometric tracking is relatively expensive.

Figure 2:
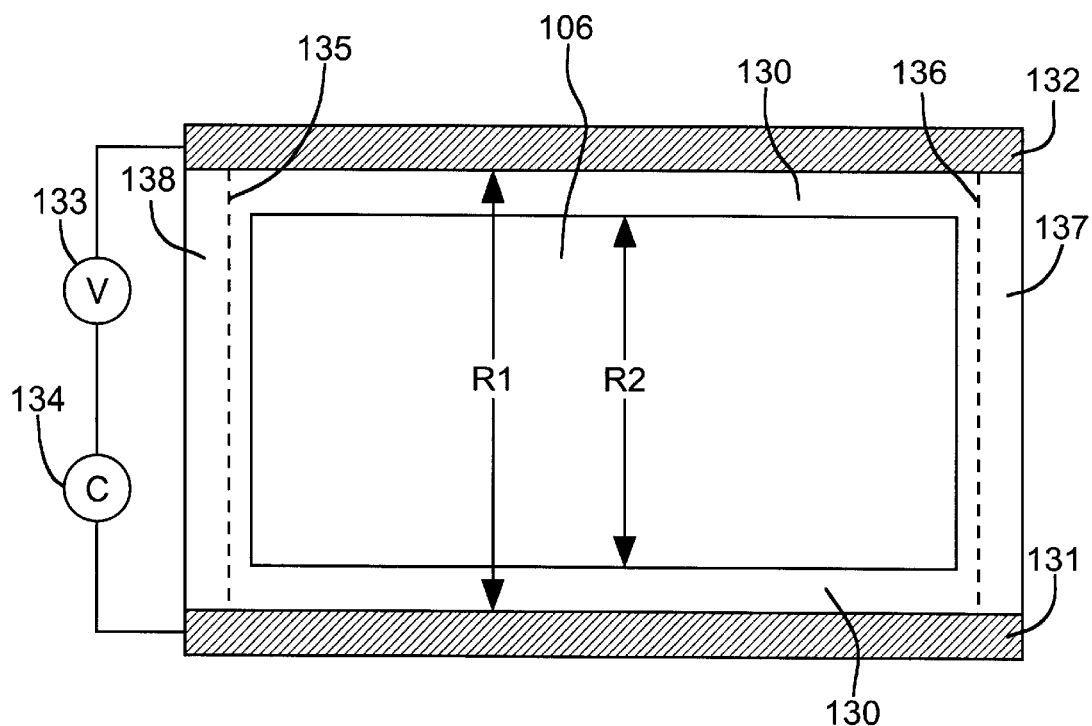
FIG. 2 is a schematic representation of a mirror electrode of a reversible electrochemical mirror (REM) device (as viewed from the electrolyte side) illustrating a suitable contact arrangement and measurement system for determining the thickness of mirror metal deposited on the mirror electrode.

FIG. 2 illustrates a preferred contact arrangement and measurement system for determining the thickness of mirror metal deposited on the mirror electrode of a rectangular REM device according to the present invention. A seal 130 formed between mirror electrode 106 and counter electrode 110 (not shown in FIG. 2) forms a compartment that contains the electrolyte and delineates its area of contact with electrode 106 (center rectangle in FIG. 2). The mirror electrode (and/or the counter electrode) may be curved to form a cylindrical section or other geometric shape.

Seal 130 may be formed by a polymer adhesive, o-ring, gasket or other means, and a spacer may be used to provide a constant spacing between the two electrodes. Electrical contacts 131 and 132 are provided along two opposite sides of electrode 106 outside the seal area, preferably by attaching strips of a conductive metal, such as copper, using an electrically conductive adhesive. A variety of other means could be used to attach contacts 131 and 132, including the use of pressure provided by a spring mechanism. Contacts 131 and 132 may be used both to apply voltage for switching the mirror state (i.e., electrodeposit or dissolve metal from the mirror electrode) and to measure the sheet resistance of electrode 106 so as to determine the thickness of the mirror metal deposit on electrode 106. Separate contacts can be used and, as discussed below, can provide the degree of electrical isolation needed to permit determination of the thickness of mirror metal layer 120 while the mirror state is being switched.

Note that direct contact between the electrical contacts and the electrolyte should be avoided since plating of mirror metal on the contacts could affect the uniformity of the mirror deposits obtained. In addition, contacts exposed to the electrolyte would have to be sufficiently corrosion-resistant to avoid degradation under anodic voltages used for mirror state switching, which would require more expensive materials or coatings while providing no advantage.

Sheet resistance is normally defined as the electrical resistance per unit area of a layer or sheet of a given material and is measured in such a way that contact resistances and contributions from contiguous layers of other materials are negligible or taken into account. Throughout this document, unless stated otherwise, the term "sheet resistance" is used to denote the resistance measured between two separate contacts attached to the mirror electrode of a REM device and specifically includes contributions from contiguous and adjacent layers of other materials. Contact resistances associated with the interfaces between the electrical contacts and the mirror electrode, which are in series with the mirror electrode sheet resistance, are typically small enough to be negligible or are relatively constant with time so that their effect can be taken into account by periodic calibration.

According to the present invention, the thickness of deposited mirror metal is determined from its effect on the sheet resistance of the mirror electrode. From FIG. 1, it is evident that the measured sheet resistance will include parallel contributions from mirror electrode 106, nucleation layer 108, and mirror metal layer 120. Note that the electrolyte resistance is generally high enough that the currents flowing along electrolyte layer 112 and counter electrode layers 110 and 114 are small. In addition, nucleation layer 108 is typically very thin (15–30 Å) and has a minimal effect on the sheet resistance of mirror electrode 106, which is at least 10 ohm/square for the indium tin oxide typically used. Consequently, the thickness of mirror metal layer 120 has the largest effect on the measured sheet resistance.

In FIG. 2, the sheet resistance of mirror electrode 106 is designated as R1 and the parallel resistance of the mirror metal layer 120 is designated as R2. Since these resistances are in parallel, the measured sheet resistance (R) is given by: $1/R=1/R1+1/R2$, subject to the assumptions stated above. In principle, the sheet resistance can be calculated as a function of the thickness of the mirror metal deposit but the calculation is complicated by geometric considerations. Note that part of mirror electrode layer 106 extends through the seal area and into the areas of contacts 131 and 132, whereas mirror metal deposition does not occur in these areas. Consequently, R1 and R2 are determined by layers of different length (as indicated by the arrows in FIG. 2). Likewise, mirror metal deposition does not occur in the seal areas on the non-contact sides of the device. In this case, however, the extra mirror electrode material represents an additional current path that can cause non-uniform current distribution for both the resistance measurement and mirror state switching. Thus, it is desirable that mirror electrode layer 106 on the non-contact sides extend to just within the seal area, as indicated by dashed lines 135 and 136 (areas 137 and 138 are bare substrate), but some such extension is typically required to avoid exposure of the electrode edges not protected by nucleation layer 108 to the electrolyte. Other factors that render exact calculation of the sheet resistance of mirror electrode 106 difficult include manufacturing and time variations in the layer thicknesses and materials properties, and appreciable contributions from contact resistances and layers 112, 114 and 110 in the device.

On the other hand, it is a relatively simple matter to measure the mirror electrode sheet resistance as a function of mirror metal thickness to provide a calibration curve for future measurements or for other devices of the same type. By utilizing the change in resistance produced by the deposited mirror metal and periodically re-measuring the sheet resistance of the electrode without a mirror metal deposit, the effects of variations with time and from device to device can be minimized. The thickness of the mirror metal deposit can readily be ascertained from the charge passed for its electrodeposition, using the bare electrode as the baseline. By also measuring the reflectance of the REM device as a function of mirror metal thickness, the device reflectance can then be determined by measuring the mirror electrode sheet resistance. Note that this calibration approach will also yield accurate measurements of the mirror metal thickness and device reflectance for other electrode geometries and placements of the electrical contacts. The method of this invention should be applicable to any REM geometry and contact arrangement that provides uniform mirrors. It should also provide an average thickness for non-uniform mirror deposits. In addition, separate contacts can be used for the sheet resistance measurements and be located so as to measure only a portion of the mirror deposit or to provide a degree of electrical isolation with respect to the contacts used to apply the mirror state switching voltage.

As illustrated in FIG. 2, the sheet resistance of electrode 106 may be measured by applying a direct (dc) or alternating (ac) voltage perturbation between contacts 131 and 132 via voltage source 133 and measuring the current response via current measuring device 134. An ac measurement has the advantage of minimizing voltage losses due to contact resistances, which may vary appreciably with time and would introduce errors in the measurement. The voltage perturbation frequency is preferably chosen to minimize the effects of capacitive and inductive losses, as indicated by a near-zero phase shift between the applied ac voltage and the ac current response. Frequencies greater than 5 kHz are typically suitable. In some cases, it may be necessary to take this phase shift into account to calculate an accurate sheet resistance for the mirror electrode. The magnitude of the applied voltage perturbation is not critical but is preferably chosen to yield a current response that is large enough to enable accurate measurement of the current response but not so large that functioning or control of the REM device is impaired, e.g., by Joule heating effects.

Measurement of the sheet resistance of mirror electrode 106 according to the present invention can also be made while mirror metal is being electrodeposited on or dissolved from the mirror electrode, i.e., during switching of the device mirror state. Since the contacts used to apply the voltage for mirror state switching must generally be shorted together electrically to minimize mirror nonuniformity associated with localized voltage differences, it is necessary to provide some degree of electrical isolation for sheet resistance measurements performed during mirror state switching. Such electrical isolation can be accomplished in numerous ways; two examples are given below.

Figure 3:
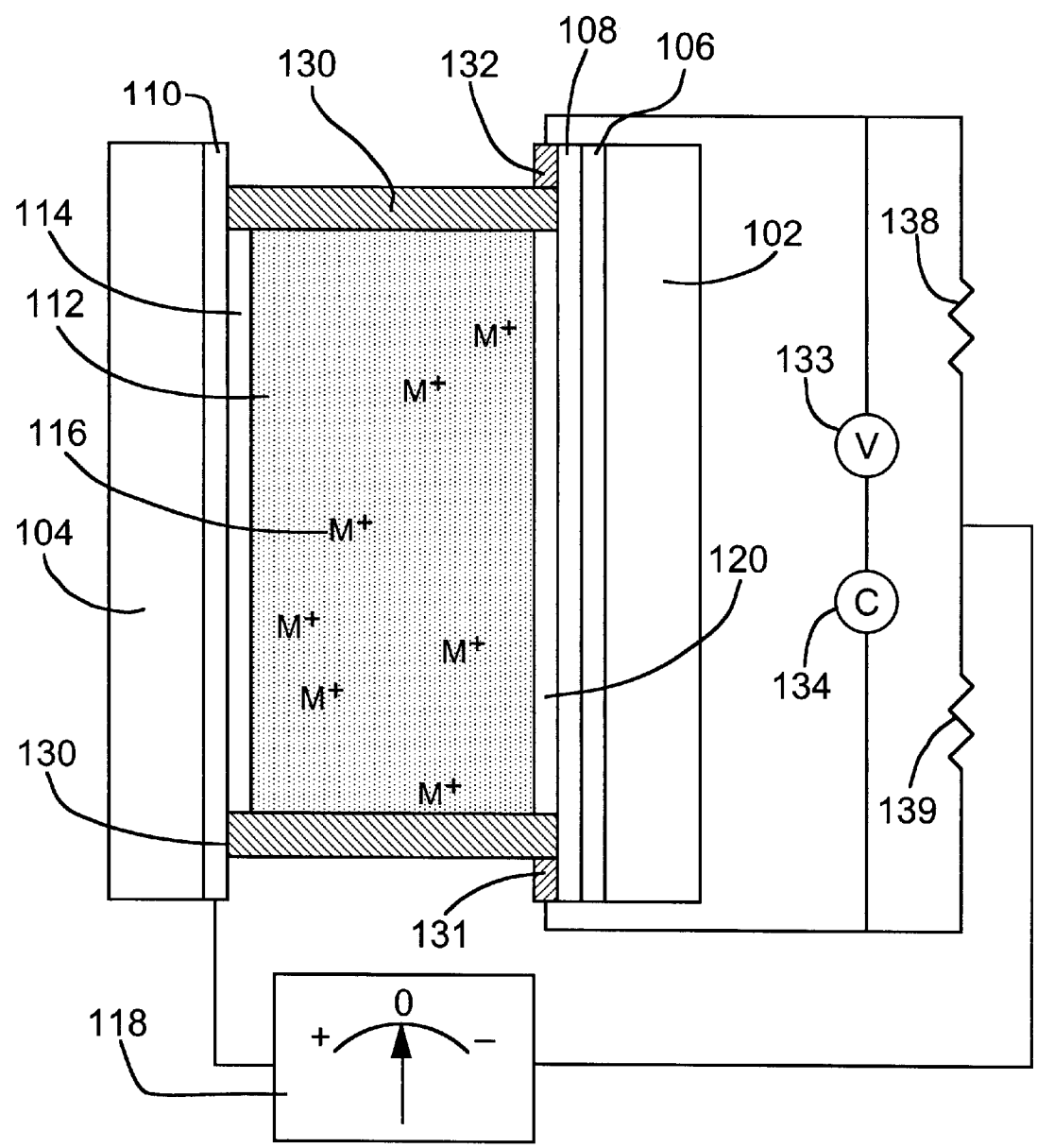
FIG. 3 is a cross sectional view similar to FIG. 1, but also showing the contact-seal arrangement of FIG. 2 and illustrating the use of external resistors to provide partial electrical isolation for mirror electrode sheet resistance measurements during mirror state switching with the same electrical contacts.

FIG. 3 illustrates use of external resistors to provide partial electrical isolation for the circuit used to measure the mirror electrode sheet resistance so that the thickness of the mirror metal deposit can be determined while the mirror state is being switched. In this case, electrical contacts 131 and 132 located on opposite sides of mirror electrode 106 are used both to switch the mirror state and measure the sheet resistance. Potential source 118 is connected to contacts 131 and 132 via series resistors 138 and 139, which have equal values. Voltage source 133 and current measuring device 134 used to measure sheet resistance are connected directly to contacts 131 and 132. Being electrically in parallel with electrode layer 106 and mirror metal layer 120, resistors 138 and 139 reduce the overall measured resistance but can be chosen to be sufficiently large that good sensitivity to the thickness of mirror metal is retained. For this approach, additional switching voltage is required to offset the voltage drops across resistors 138 and 139, which are in series with the switching power source. More sophisticated circuitry could be used to minimize such voltage drops and provide better measurement precision.

Figure 4:
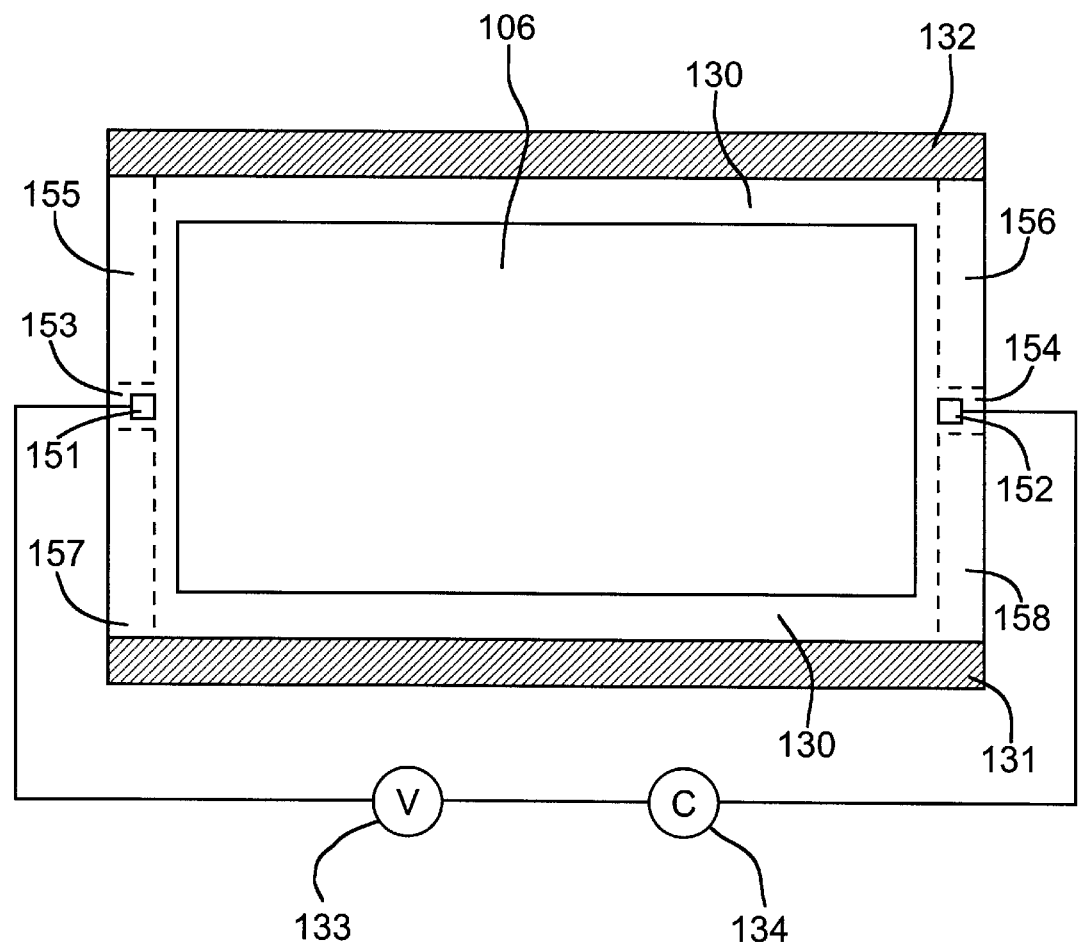
FIG. 4 is a schematic representation similar to FIG. 2 but illustrating placement of separate electrical contacts to provide electrical isolation for mirror electrode sheet resistance measurements during mirror state switching.

FIG. 4 illustrates placement of separate electrical contacts on the mirror electrode to provide internal electrical isolation for the circuit used to measure the mirror electrode sheet resistance so that the thickness of the mirror metal deposit can be determined while the mirror state is being switched. In the illustrated embodiment of this approach, electrical contacts 151 and 152 for measuring the sheet resistance are placed on the sides of electrode 106 not having contacts 131 and 132, which are used to apply the mirror switching voltage (circuit not shown). The resistance between contacts 151 and 152 is measured by applying a voltage via voltage source 133 and measuring the current response via current measuring device 134. By making contacts 151 and 152 relatively small and locating them midway between contacts 131 and 132, flow of the measurement current along contacts 131 and 132 is minimized by the relatively high sheet resistance of layer 106. Small area contacts also minimize shunting across the contact that might locally decrease the uniformity of the mirror deposit. The measured sheet resistance in this case is proportional to the thickness of the mirror metal layer 120 and can be calibrated to provide a measure of the mirror reflectance. Further electrical isolation of contacts 151 and 152 from contacts 131 and 132 can be attained by placing contacts 151 and 152 on tabs 153 and 154 of mirror electrode material 106, as indicated by the dashed line in FIG. 4. Bare substrate areas 155, 156, 157 and 158 minimize current flow between the measurement contacts (151 and 152) and the buss bars (131 and 132) used to switch the mirror state. There are numerous contact arrangements that would provide relative sheet resistance values for determining the mirror metal thickness according to the present invention.

For example, contact 152 could be eliminated and the resistance between contact 151 and electrically shorted contacts 131 and 132 could be measured.

Fabrication of a Preferred Embodiment

The preferred mirror electrode utilizes a glass or plastic substrate which is uniformly coated on one side with an optically transparent conductive film, e.g., indium tin oxide (ITO) or fluorinedoped tin oxide (FTO), which has relatively low resistivity (about 10 ohm/square) and serves as the mirror electrode and current collector. An optically-thin adherent inert metal, such as Pt, is vapor deposited, preferably by sputtering, onto the ITO or FTO surface to enhance the uniformity of nucleation for metal deposition so as to provide a mirror deposit. Other electrochemically inert metals can be used, including gold, palladium, rhodium, iridium, ruthenium and rhenium. It may be advantageous in some cases to employ a duplex metal film, e.g., Ti/Au or Cr/Au, in which a very thin underlayer of metal (e.g., Ti or Cr) serves to improve adhesion of the noble metal nucleation layer to the electrode. A nucleation layer is not necessary for some REM systems, notably aqueous silver cyanide electrolytes.

For REM devices involving adjustable transmittance, the preferred counter electrode is locally distributed, as described in U.S. Pat. No. 5,903,382 to Tench et al., which is assigned to the same assignee as the present application. In this case, the counter electrode comprises an electrochemically inert metal grid or nucleation layer matrix pattern of relatively small overall area so that metal plated on the counter electrode blocks only a small fraction of the radiation.

For adjustable reflectivity REM devices, the preferred counter electrode comprises a reasonably thick (e.g., 1 $\mu$m) layer of mirror metal on an electrochemically stable conducting substrate, e.g., a 15 to 30 Å layer of Pt on an ITO/glass or plastic substrate, used in conjunction with a light-absorbing electrolyte to reduce reflection of radiation from the counter electrode. When the counter electrode material is not electrochemically stable under the operating conditions, an excess amount of mirror metal should be used so that the counter electrode is always covered with the mirror metal and is not exposed to the electrolyte. Alternatively, a protective layer of an electrochemically inert metal, such as platinum, is used between the reactive substrate and the mirror metal. Prior to cell assembly, the counter electrode, if other than the mirror metal, is plated with a quantity of mirror metal sufficient to provide the desired amount of reflectivity when deposited on the mirror electrode and to prevent exposure of the counter electrode substrate metal to the electrolyte. Alternatively, the mirror electrode can be plated with this initial mirror metal charge.

The preferred electrolyte is both chemically and electrochemically stable except with regard to electrodeposition/ dissolution of the mirror metal. Preferably, the mirror metal is silver added to the electrolyte as a silver halide (or pseudohalide) rendered stable and highly soluble in the electrolyte by addition of halide/pseudohalide anions derived, at least partially, from a compound(s) having a cation(s) that is not electroactive under the REM operating conditions (e.g., lithium or sodium). Other mirror metals having relatively low toxicity and good electrochemical characteristics include copper, tin, and bismuth. A mixture of halide/pseudohalide ions (chloride, iodide, bromide, cyanide and thiocyanate) may be employed. The preferred solvent is essentially nonaqueous and is chosen with respect to its freezing and boiling point to provide the desired temperature operating range, as well as good electrolyte stability and good mirror cycling characteristics. Preferred solvents include gamma butyrolactone (GBL), ethylene glycol (EG), dimethylsulfoxide (DMSO), dimethylformamide (DMF), and mixtures of these. Appreciable amounts of water may be added to suppress the freezing temperature of some solvents, e.g., ethylene glycol. Solubility considerations may limit the acceptable combinations of mirror metal salts and halide/pseudohalide compounds. Additives that are electroactive or decomposed during electrodeposition/dissolution of the mirror metal, such as organic compounds normally used for leveling and brightening electrodeposits, should be avoided since they would limit the device cycle life.

Although the REM device can be fabricated using a liquid electrolyte, use of an electrolyte stiffener is preferred for many applications to minimize transport of detrimental atmospheric contaminants (e.g., oxygen) and prevent electrolyte loss that may affect mirror performance or create a chemical safety hazard, and to adhesively hold glass fragments formed during accidental breakage that could otherwise cause physical personal injury. Preferred electrolyte stiffeners are dispersed inorganic materials, e.g., highly dispersed silica (HDS) or alumina, which form thixotropic gels that can be liquefied by mechanical shearing for facile injection in REM cells, and typically have minimal effect on the electrolyte conductivity and REM performance. Such gels may in some cases have a beneficial effect on the REM mirror quality and/or cycle performance, and are relatively stable with temperature and adhere well to REM electrode materials.

For adjustable mirror applications, a coloring agent is preferably added to the REM electrolyte so that light reflection is minimized for the non-mirror state. A preferred coloring agent in this case is dispersed carbon black, which, in small amounts, provides high light absorption over a wide spectral range (that includes all visible light wavelengths), and tends to protect the electrolyte from degradation by ultraviolet light. The carbon black is preferably suspended by ultrasonic agitation and maintained in suspension by subsequent addition of an electrolyte stiffener.

The reversible electrochemical cells pertaining to this invention can be fabricated using spacers and a polymer sealant, or using a gasket or o-ring to provide both the proper spacing and a seal. The spacer and seal materials must be chemically compatible with the electrolyte. The preferred electrode separation is about 0.05–3.0 mm. The electrodes may be planar or curved.

The preferred REM cell geometry is rectangular or square with the electrical contacts for switching the mirror state being provided by copper strips attached with conductive adhesive that run the length of two opposite sides. Contacts are preferably placed outside the seal area so that they are not in contact with the electrolyte. The same contacts can be used to measure the sheet resistance of the mirror electrode, preferably using an applied alternating voltage having a frequency (e.g., 10–30 kHz) for which the phase shift of the corresponding current approaches zero. For measuring the sheet resistance while the REM mirror state is switched, a preferred approach is to provide separate small-area contacts located midway on the sides of the device not having the contacts for applying the switching voltage.

The sheet resistance is calibrated in terms of the thickness of mirror metal on the mirror electrode, preferably by measuring the charge required to deposit a given amount of mirror metal. After calibration via standard reflectance measurement methods, the sheet resistance provides an accurate measure of the device reflectance.

EXAMPLE

An adjustable reflectivity REM device having a viewing area of approximately 6.1×8.9 cm was constructed using a mirror working electrode comprised of a 15 Å sputtered platinum nucleation layer on a 10-ohm/square ITO film on a glass substrate (10 cm square). The counter electrode was 60 Å sputtered Pt on 10 ohm/square ITO on a glass substrate (10 cm square), which had been electroplated with about 1 $\mu$m of silver from a commercial cyanide bath (Technisilver 2E, Technic Co.) and annealed at 200° C. for 30 minutes in an inert atmosphere (to improve adhesion) prior to cell assembly. A bare Pt/ITO border was left around the plated silver (via masking with plater's tape) to permit formation of a good seal with acrylic adhesive tape (VHB #4910, 3M Company), which also overlapped the plated silver to protect its edges. This acrylic tape (about 5 mm wide) served as both the electrode spacer (1 mm) and primary sealant and was placed inside the perimeter of glass panes so as to leave room for two 3-mm wide copper buss bars, which were attached to the Pt/ITO layer along the two longer sides of the device with conductive adhesive (C665, Furon Co.). Electrolyte preparation and final device assembly were performed inside a nitrogen atmosphere glove box to avoid contamination with oxygen, which reacts electrochemically and can cause mirror self-erasure via chemical dissolution of the mirror metal. The electrolyte was injected through the acrylic tape using a pair of hypodermic needles (inlet and outlet) and a syringe. Epoxy was used to provide a second seal and to help hold the buss bars in place. The electrolyte contained 1.5 M AgI+2.0 M LiBr+63 mg/mL highly dispersed silica (M-5 Cab-O-Sil, Cabot Co.)+1.5 mg/mL carbon black (Vulcan, Cabot Co.) in high-purity GBL solvent (<20 ppm water). Addition of the highly dispersed silica produced a thixotropic gel that could be liquefied by stirring but became stiff upon standing. This REM device exhibited excellent mirror quality (reflectance at 700 nm wavelength of 6.0% minimum, and 80% with a 400 Å silver deposit) and could be switched repetitively without change in reflectance for a given amount of silver deposited on the mirror electrode.

Figure 5:
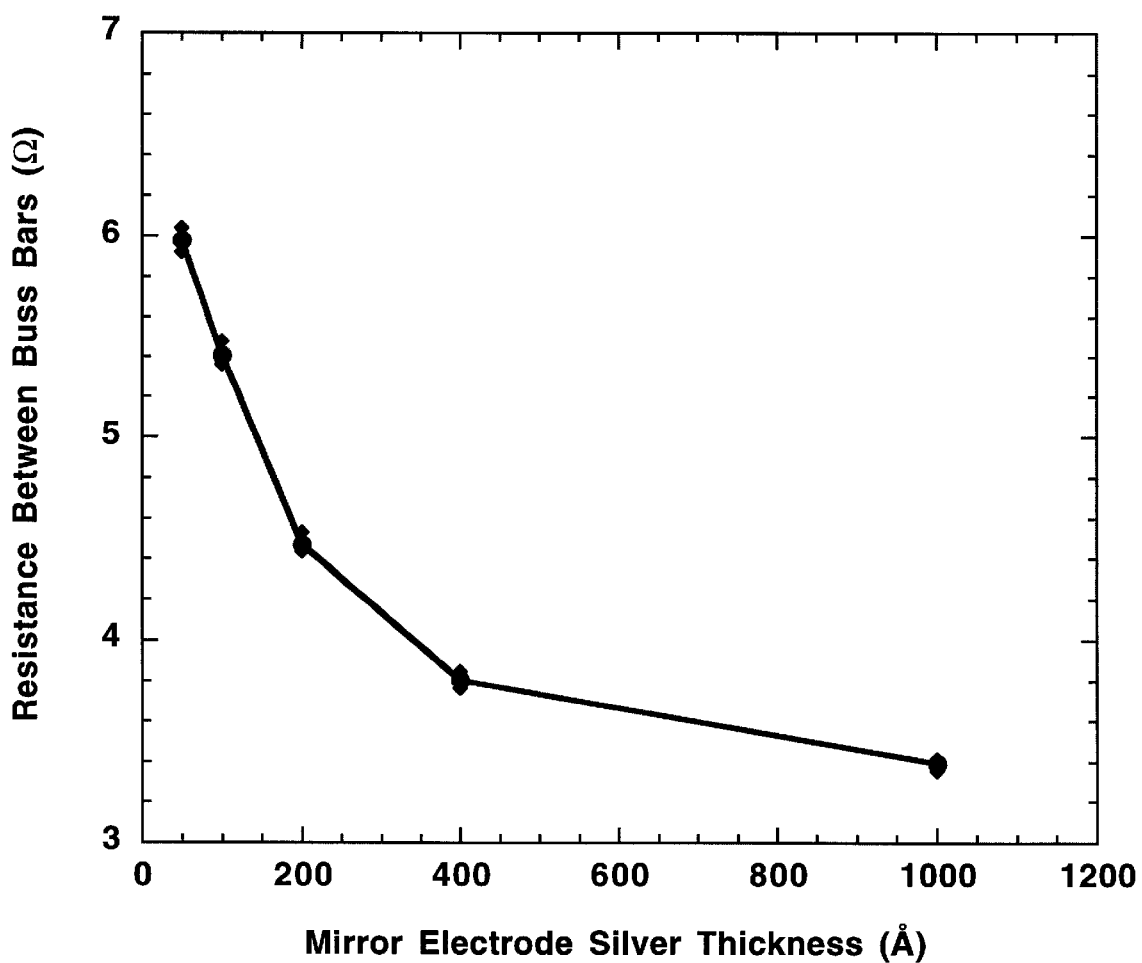
FIG. 5 gives a plot of the resistance measured between buss bars attached outside the seal area of a REM device (containing a silver halide electrolyte) as a function of the silver thickness on the mirror electrode.

FIG. 5 shows the sheet resistance measured between the copper buss bars (for the device described above) as a function of the thickness of the silver deposit on the mirror electrode determined from the charge passed. Good sensitivity of the sheet resistance to silver thickness over a wide range is evident. Sensitivity is particularly good at silver thicknesses below 400 Å, which provides nearly the maximum reflectance. Reproducibility is also excellent as indicated by the triple data points for each silver thickness, which were measured after the silver deposit had been fully dissolved and then redeposited.

Figure 6:
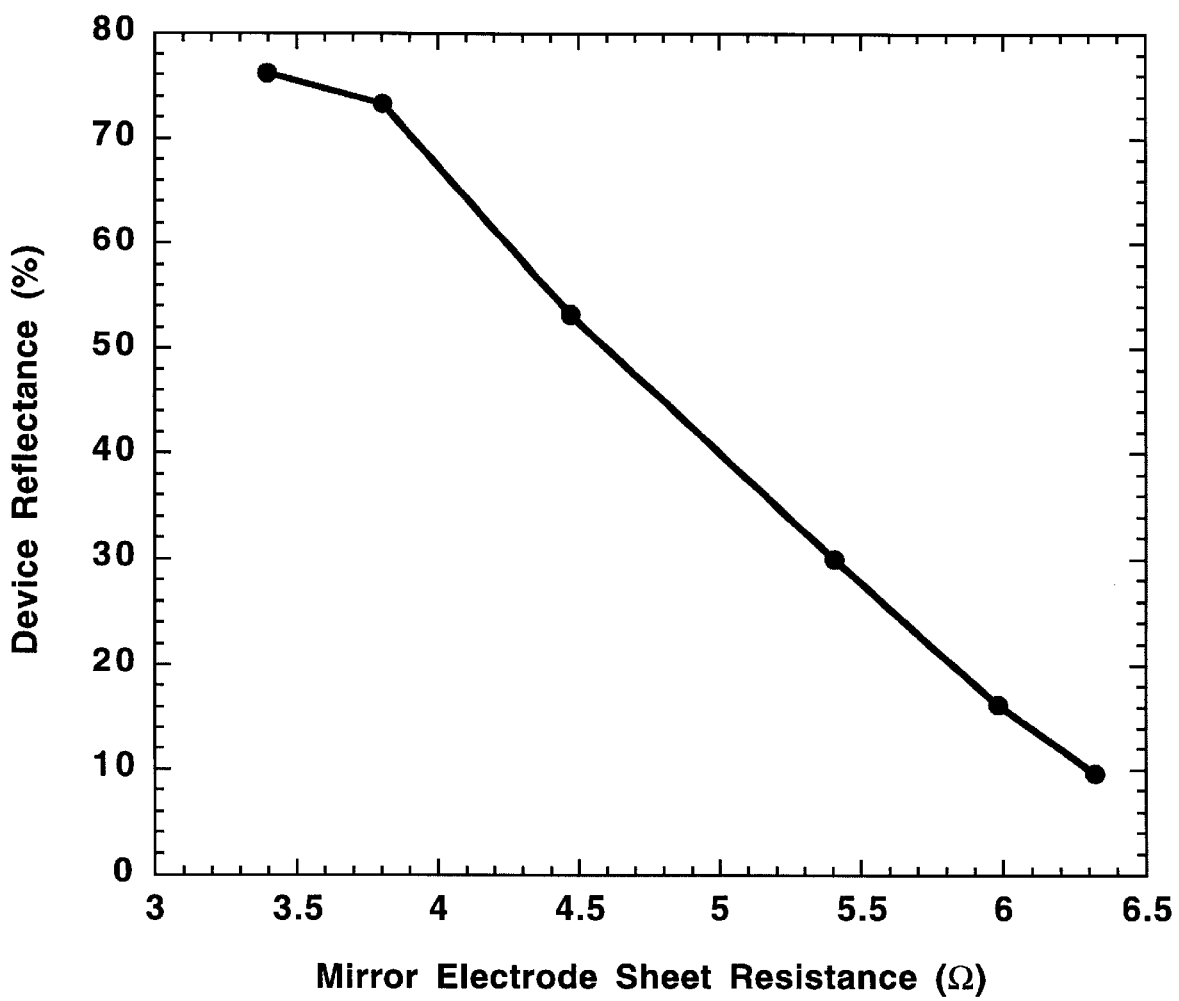
FIG. 6 gives a plot of reflectance at 700 nm wavelength as a function of measured sheet resistance for the same REM device as for FIG. 5.

FIG. 6 shows the dependence of the reflectance (measured by double reflection at 700 nm wavelength) on the measured sheet resistance (for the device described above). The reflectance is seen to decrease linearly with increasing sheet resistance with good sensitivity over a wide range.

Features of the Invention

The reversible electrochemical mirror (REM) device to which this invention pertains comprises a mirror electrode and a counter electrode in contact with an electrolyte containing ions of an electrodepositable mirror metal, e.g., silver. A constant distance of about 1.0 mm is typically maintained between the two electrodes by a spacer/seal combination, which serves to contain the electrolyte and prevent atmospheric contaminants from entering the device. Electrical contacts to the electrodes are generally placed outside the seal so that they are not contacted by the electrolyte.

The mirror electrode is typically comprised of a transparent oxide conductor, e.g., indium tin oxide (ITO), on a transparent glass or plastic substrate, whereas the counter electrode is a metallic sheet for an adjustable reflectance device and is a locally distributed electrode when the device is also used to control light transmission. Reversible electrodeposition of a layer of mirror metal on the mirror electrode is used to vary the reflectance and/or transmittance of the device for radiation. A thin layer of an inert metal, e.g., platinum, is usually deposited by sputtering/vacuum deposition on the transparent conductor layer to improve nucleation so that a mirror deposit is obtained. The reflectance of the device is determined primarily by the thickness of the layer of mirror metal on the mirror electrode. The reverse of the metal deposition reaction occurring at the mirror electrode occurs at the counter electrode so that there is no net change in the electrolyte composition. Copper foils attached with conductive adhesive provide suitable contacts to the electrodes. For rectangular or square REM devices, contact strips running the length of two opposite sides of the device provide the most uniform mirror deposits.

A wide temperature operating range is obtained by using electrolytes based on high boiling organic solvents, e.g., γ-butyrolactone, ethylene glycol, dimethylsulfoxide, etc. Mixtures of these solvents, and/or addition of water, can extend the temperature range to lower operating temperatures. Use of a rigid electrolyte attained by incorporation of an electrochemically inert stiffening agent, either inorganic or organic, facilitates mirror fabrication, minimizes the possibility of chemical or physical personal injury, and reduces sensitivity to cell leakage and atmospheric contamination by preventing convectional transport. Use of light-absorbing suspended particles or dissolved dyes in the electrolyte minimizes reflection from the counter electrode, which suppresses ghosting and lowers the minimum reflectance for adjustable mirror devices. Such electrolyte coloring can be used with any type of REM device for aesthetic purposes.

According to the present invention, the thickness of the deposited mirror metal, which determines the reflectance of the REM device, is determined from its effect on the sheet resistance of the mirror electrode. The sheet resistance is determined from the current response to a voltage applied between two separate electrical contacts on the mirror electrode. Electrical contacts running down opposite sides of rectangular or square devices can be used both for switching the mirror state and measuring the mirror electrode sheet resistance. Contact resistances and associated measurement errors can be minimized by using an alternating (ac) voltage for the sheet resistance measurement. The ac frequency is chosen to avoid inductive and capacitive effects so that the resistance can be directly measured.

Sheet resistance of the mirror electrode can be measured while the mirror state is being switched to provide real-time feedback for controlling the device reflectance. This is accomplished by utilizing appropriate electrical contact arrangements and circuitry to minimize interactions between the switching and measurement processes. When the same contacts are used for both processes, external resistors can be used to provide the required circuitry isolation. A more straightforward approach is to use separate sets of contacts for sheet resistance measurements and mirror state switching, arranged so that the required isolation is provided by the sheet resistance of the mirror electrode.

The preferred embodiments of this invention have been illustrated and described above. Modifications and additional embodiments, however, will undoubtedly be apparent to those skilled in the art. Furthermore, equivalent elements may be substituted for those illustrated and described herein, parts or connections might be reversed or otherwise interchanged, and certain features of the invention may be utilized independently of other features. Consequently, the exemplary embodiments should be considered illustrative, rather than inclusive, while the appended claims are more indicative of the full scope of the invention.

What is claimed is:

1. A method for determining the thickness of a mirror metal deposit on a mirror electrode of a reversible electrochemical mirror device for controlling the propagation of electromagnetic radiation, of the type including
    a mirror electrode,
    a counter electrode, at least one of the mirror and counter electrodes being substantially transparent to at least a portion of the spectrum of electromagnetic radiation, and
    an electrolyte disposed between and in electrical contact with the mirror and counter electrodes, wherein the electrolyte contains cations of an electrodepositable mirror metal,
    such that a negative electrical potential applied to the mirror electrode relative to the counter electrode tends to cause mirror metal to dissolve from the counter electrode into the electrolyte and to electrodeposit from the electrolyte onto the mirror electrode as a mirror deposit, and
    such that a positive electrical potential applied to the mirror electrode relative to the counter electrode tends to cause mirror metal to dissolve from the mirror electrode into the electrolyte and to electrodeposit onto the counter electrode,
    the thickness of deposited mirror metal subsisting on the mirror electrode affecting the reflectance of the device for electromagnetic radiation,
    comprising the steps of:
    (1) measuring the electrical resistance between two locations on the mirror electrode; and
    (2) comparing said measured resistance with a known electrical resistance for a mirror metal deposit having a known thickness, and calculating the mirror deposit thickness corresponding to the measured resistance based on the known resistance and the known thickness.

2. The method of claim 1, wherein said step of measuring comprises the steps of applying an alternating voltage and measuring an alternating current response to the alternating voltage.

3. The method of claim 2, wherein said measured resistance is calculated from the alternating voltage and alternating current, and the phase shift therebetween.

4. The method of claim 2, wherein the alternating voltage has a frequency such that the phase shift between the alternating voltage and the alternating current is minimal so that Ohm's law yields a close approximate value for said measured resistance.

5. The method of claim 4, wherein the frequency is more than 5 kHz.

6. The method of claim 1, wherein said step of measuring comprises the steps of
    applying a direct voltage,
    measuring the direct current response to the direct voltage, and using Ohm's law to calculate the resistance.

7. The method of claim 1, further comprising the steps of:
(3) measuring the reflectance of a device having a mirror metal deposit of known thickness; and
(4) comparing the mirror metal deposit thickness determined in step (2) with the thickness of a mirror metal deposit of known device reflectance to determine the device reflectance corresponding to said measured electrical resistance.

8. The method of claim 1, wherein the known deposit thickness is determined from the charge required for deposition of the mirror metal deposit.

9. The device of claim 1, wherein at least one of said electrical contacts is also used to apply the voltage tending to cause the mirror metal to electrodeposit upon or dissolve from the mirror electrode.

10. A device for determining the thickness of a mirror metal deposit on a mirror electrode of a reversible electrochemical mirror device for controlling the propagation of electromagnetic radiation, of the type including
a mirror electrode,
a counter electrode, at least one of the mirror and counter electrodes being substantially transparent to at least a portion of the spectrum of electromagnetic radiation, and
an electrolyte disposed between and in electrical contact with the mirror and counter electrodes, wherein the electrolyte contains cations of an electrodepositable mirror metal,
such that a negative electrical potential applied to the mirror electrode relative to the counter electrode tends to cause mirror metal to dissolve from the counter electrode into the electrolyte and to electrodeposit from the electrolyte onto the mirror electrode as a mirror deposit, and
such that a positive electrical potential applied to the mirror electrode relative to the counter electrode tends to cause mirror metal to dissolve from the mirror electrode into the electrolyte and to electrodeposit onto the counter electrode,
the thickness of deposited mirror metal subsisting on the mirror electrode affecting the reflectance of the device for electromagnetic radiation,
comprising:
(1) first and second electrical contacts located on the mirror electrode;
(2) means for measuring the electrical resistance between said electrical contacts;
(3) means for correlating said measured resistance to a resistance for a known thickness of deposited mirror metal; and
(4) means for calculating the thickness of the mirror metal deposit corresponding to said measured resistance.

11. The device of claim 10, wherein at least one of said electrical contacts is a metal piece attached to the mirror electrode by means of an electrically conductive adhesive material.

12. The device of claim 10, wherein at least one of said electrical contacts to the mirror electrode is provided by vapor or solution deposition of a metal layer.

13. The device of claim 10, wherein at least one of said electrical contacts is maintained by pressure provided by a clamping means.

14. The device of claim 10, wherein at least one of said electrical contacts is not in electrical contact with the electrolyte.

15. The device of claim 10, wherein said electrical contacts are provided on opposite sides of a rectangular mirror electrode.

16. The device of claim 15, wherein said electrical contacts comprise metallic strips attached along opposite sides of the mirror electrode by means of conductive adhesive.

17. The device of claim 10, wherein at least one of said electrical contacts is located at the midpoint of at least one of the opposite sides that does not contain a contact used to apply the voltage tending to cause the mirror metal to electrodeposit upon or dissolve from the mirror electrode.

18. A method for determining the thickness of a mirror metal deposit on a mirror electrode of a reversible electrochemical mirror device for controlling the propagation of electromagnetic radiation, of the type including
a mirror electrode,
a counter electrode, at least one of the mirror and counter electrodes being substantially transparent to at least a portion of the spectrum of electromagnetic radiation, and
an electrolyte disposed between and in electrical contact with the mirror and counter electrodes, wherein the electrolyte contains cations of an electrodepositable mirror metal,
such that a negative electrical potential applied to the mirror electrode relative to the counter electrode tends to cause mirror metal to dissolve from the counter electrode into the electrolyte and to electrodeposit from the electrolyte onto the mirror electrode as a mirror deposit, and
such that a positive electrical potential applied to the mirror electrode relative to the counter electrode tends to cause mirror metal to dissolve from the mirror electrode into the electrolyte and to electrodeposit onto the counter electrode,
the thickness of deposited mirror metal subsisting on the mirror electrode affecting the reflectance of the device for electromagnetic radiation,
comprising the steps of:
(1) measuring the electrical resistance between two locations on the mirror electrode;
(2) comparing said measured resistance with a known electrical resistance for a mirror metal deposit having a known thickness, and calculating the mirror deposit thickness corresponding to the measured resistance based on the known resistance and the known thickness;
(3) measuring the reflectance of a device having a mirror metal deposit of known thickness; and
(4) comparing the mirror metal deposit thickness determined in step (2) with the thickness of a mirror metal deposit of known device reflectance to determine the device reflectance corresponding to said measured electrical resistance.

19. The method of claim 18, wherein said resistance and said reflectance are measured for a plurality of mirror metal deposit thicknesses to provide a calibration for determining said reflectance from said measured resistance.

* * * * *